United States Patent
Lee et al.

(10) Patent No.: US 7,228,553 B2
(45) Date of Patent: Jun. 5, 2007

(54) OPTICAL PICKUP ACTUATOR AND OPTICAL RECORDING AND/OR REPRODUCING APPARATUS EMPLOYING THE SAME

(75) Inventors: Young-bin Lee, Seoul (KR); Duk-young Chong, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 285 days.

(21) Appl. No.: 10/778,314

(22) Filed: Feb. 17, 2004

(65) Prior Publication Data
US 2005/0030841 A1    Feb. 10, 2005

(30) Foreign Application Priority Data
Feb. 18, 2003  (KR) .................... 10-2003-0010045

(51) Int. Cl.
*G11B 7/135*    (2006.01)
(52) U.S. Cl. ..................................... 720/683
(58) Field of Classification Search ................. 720/683
See application file for complete search history.

(56) References Cited

U.S. PATENT DOCUMENTS

| | | | | |
|---|---|---|---|---|
| 5,216,648 A | * | 6/1993 | Noda et al. | 369/44.14 |
| 5,526,340 A | * | 6/1996 | Tanaka | 720/685 |
| 5,541,899 A | * | 7/1996 | Kume et al. | 369/44.14 |
| 5,554,843 A | * | 9/1996 | Leonard | 250/201.5 |
| 5,663,843 A | * | 9/1997 | Ezawa et al. | 359/824 |
| 6,285,650 B1 | * | 9/2001 | Park | 720/683 |
| 6,377,521 B1 | * | 4/2002 | Kijima et al. | 369/44.23 |
| 6,922,842 B2 | * | 7/2005 | Takahashi et al. | 720/684 |
| 2003/0016597 A1 | * | 1/2003 | Haruguchi et al. | 369/44.16 |
| 2003/0210641 A1 | * | 11/2003 | Shinozuka | 369/244 |

FOREIGN PATENT DOCUMENTS

| | | |
|---|---|---|
| JP | 5-197982 | 8/1993 |
| JP | 7-235093 | 9/1995 |

(Continued)

OTHER PUBLICATIONS

Notice of Office Action issued by the Korean Patent Office in Application No. 10-2003-0010045 on Jan. 18, 2005 with an English language translation thereof.

(Continued)

*Primary Examiner*—Hoa T. Nguyen
*Assistant Examiner*—Mark Blouin
(74) *Attorney, Agent, or Firm*—Staas & Halsey LLP

(57) ABSTRACT

An optical pickup actuator includes a; a bobbin in which a through hole is formed, an objective lens attached to the bobbin; a holder provided on the base to support the bobbin; a lens holder inserted in the through hole of the bobbin to support the objective lens, wherein the lens holder is made of a material having a heat conduction coefficient lower than that of the bobbin, a plurality of suspensions, each having one end coupled to the bobbin and the other end attached to a holder provided on a base, to support the bobbin capable of suspending, and a driving unit having a coil installed at the bobbin and a magnet installed on the base to drive the bobbin with an electromagnetic force generated by the interaction of current flowing in the coil and a magnetic field formed by the magnet.

22 Claims, 3 Drawing Sheets

FOREIGN PATENT DOCUMENTS

| | | |
|---|---|---|
| JP | 9-035317 | 2/1997 |
| JP | 09-134534 | 5/1997 |
| JP | 11-023808 | 1/1999 |
| JP | 11176009 A * | 7/1999 |
| JP | 2001-184685 | 7/2001 |
| JP | 2001-209956 | 8/2001 |
| KR | 2002-40599 | 5/2002 |

OTHER PUBLICATIONS

First Office Action dated Jun. 22, 2006 of the Chinese Application No. 2004100074270 that corresponds to the present U.S. patent application (total of 7 pages).

* cited by examiner

OPTICAL PICKUP ACTUATOR AND OPTICAL RECORDING AND/OR REPRODUCING APPARATUS EMPLOYING THE SAME

CROSS-REFERENCE TO RELATED APPLICATIONS

This application claims the priority of Korean Patent Application No. 2003-10045, filed on Feb. 18, 2003, in the Korean Intellectual Property Office, the disclosure of which is incorporated herein in its entirety by reference.

BACKGROUND OF THE INVENTION

1. Field of the Invention

The present invention relates to an optical recording and/or reproducing apparatus, and more particularly, to an optical pickup actuator having a structure that significantly reduces and can prevent the transfer of heat generated from a coil of a driving unit to a lens, and an optical recording and/or reproducing apparatus employing the same.

2. Description of the Related Art

In general, optical recording and/or reproducing apparatuses, such as compact disk players (CDPs) or digital versatile disk players (DVDPs), include optical pickups to record and reproduce information with respect to an optical disc that is a recording medium. The optical pickup is accommodated on a turntable and records information by emitting light to the optical disc through an objective lens or reproduces information by receiving the light reflected by the optical disc, while moving in a radial direction of the optical disc that is rotated by a spindle motor. The optical pickup includes an optical pickup actuator that drives the objective lens in a track direction and a focus direction of the optical disc so that a light spot is formed at a desired position on a track of the optical disc.

Since portable apparatuses such as notebook computers are made thin and light, the optical pickup actuator that is installed in the optical pickup of the portable apparatuses must be slim. Thus, a reflection mirror to guide light towards the objective lens is adopted in the optical pickup. In order to reduce the distance between the objective lens of the optical pickup and the reflection mirror, so as to meet the need of being slim, an asymmetrical optical pickup actuator has been suggested in which a drive axis of the optical pickup actuator and an optical axis of the objective lens are differently arranged.

FIG. 1 is a perspective view illustrating a conventional asymmetrical optical pickup actuator. FIG. 2 is a sectional view, taken along line A–A' of FIG. 1, illustrating a portion where a bobbin and an objective lens are combined.

Referring to FIG. 1 and FIG. 2, the conventional optical pickup actuator includes a bobbin 12 where an objective lens 11 is installed, a plurality of suspension wires 15 enabling the bobbin 12 to suspend with respect to a holder 14 that is installed on a base 13, and a driving unit to drive the bobbin 12 in a focus direction F and a tracking direction T.

The driving unit includes a focus coil 16 and a tracking coil 17 installed at the bobbin 12 and a pair of a magnet 18 and a yoke 19 which generate an electromagnetic force to drive the bobbin 12 by interacting with the current flowing in the focus coil 16 and the tracking coil 17. The focus coil 16 and the tracking coil 17 are capable of moving together with the bobbin 12 while the magnet 18 and the yoke 19 are fixedly installed on the base 13.

PCBs 20 to apply current to the focus coil 16 and the tracking coil 17 are arranged at both sides of the bobbin 12. A bond 21 is coated on a surface of the bobbin 12 in order to prevent the optical disc from being damaged due to collision between the bobbin 12 and the optical disc.

In the above structure, current is applied to the focus coil 16 and the tracking coil 17 via an electromagnetic force. The electromagnetic force is generated from the interaction of the current flowing through the focus coil 16 and the tracking coil 17 and the magnetic field formed by the magnet 18. The bobbin 12 moves in the focus direction F and the tracking direction T by the electromagnetic force. Accordingly, the objective lens 11 mounted on the bobbin 12 moves in the focus direction F and the tracking direction T.

However, in the conventional asymmetrical optical pickup actuator, since the coils 16 and 17 directly contact the bobbin 12 where the object lens 11 is mounted, a heat transfer problem may easily occur as a result of heat being generated when current is applied to the coils 16 and 17 for driving. That is, the heat generated from the coils 16 and 17 is transferred to the bobbin 12. The heat is easily transferred to the objective lens 11 directly contacting the bobbin 12, thereby deforming or damaging the objective lens 11. In particular, since the objective lens 11 is generally made from plastic material by an injection process, the objective lens 11 can easily deform due to inferior thermal-resistance properties. As a result, serious errors may occur in the operation of the optical recording and/or reproducing apparatus.

Furthermore, in a slim optical recording and/or reproducing apparatus, since the optical pickup actuator is installed in the optical pickup and the size thereof is smaller than the apparatuses of different types, the dissipation of heat is relatively difficult and the problem due to heat becomes more serious.

Many types of optical discs are produced, among which there are many low quality discs that exhibit a large amount of deformation and vibration during rotation. Accordingly, the optical disc and the optical pickup actuator frequently collide with each other. In such cases, the surface of the optical disc is damaged and, when the damage is severe, the recording and reproduction of information with respect to the optical disc is not possible.

To prevent this problem using conventional technology, a bond 21 with flexibility and buffering features is coated directly on the surface of the bobbin 12 so that the damage of the optical disc due to collision against the bobbin 12. However, it is inconvenient to coat the bond 21 directly on the surface of the bobbin 12.

SUMMARY OF THE INVENTION

To solve the above and/or other problems, the present invention provides an optical actuator having a lens holder which can restrict transfer of heat generated from a coil of a he driving unit to an objective lens and prevent damage to a disc, and an optical recording and/or reproducing apparatus employing the same.

According to an aspect of the present invention, an optical pickup actuator comprising a bobbin where a through hole is formed, a lens holder inserted in the through hole of the bobbin to support an objective lens, wherein the lens holder is made of a material having a heat conduction coefficient lower than that of the bobbin, a plurality of suspensions, each having one end coupled to the bobbin and the other end attached to a holder provided on a base of an optical pickup, to support the bobbin capable of suspending, and a driving unit having a coil installed at the bobbin and a magnet installed on the base to drive the bobbin with an electromagnetic force generated by an interaction of current flowing in the coil and a magnetic field formed by the magnet.

The lens holder has a ring shape and a step portion is formed on an inner circumference of the lens holder where an edge of the objective lens is accommodated.

At least one buffer protrusion protruding toward the optical disc is provided at the lens holder. An upper end portion of the buffer protrusion has a dome shape.

The lens holder is made of a heat-resistant plastic material. The bobbin is made of either a reinforced plastic material or a magnesium alloy material.

An optical recording and/or reproduction apparatus includes an optical pickup having an objective lens focusing light emitted from a light source on an optical disc and an optical pickup actuator driving the objective lens and installed capable of moving in a radial direction of the optical disc to record and reproduce information by emitting light to a desired position on the optical disc, in which the optical pickup actuator comprises a bobbin where a through hole is formed, a lens holder inserted in the through hole of the bobbin to support an objective lens and made of a material having a heat conduction coefficient lower than that of the bobbin, a plurality of suspensions, each suspension having one end attached to the bobbin and the other end attached to a holder provided on a base of an optical pickup, to support the bobbin capable of suspending, and a driving unit having a coil installed at the bobbin and a magnet installed on the base to drive the bobbin with an electromagnetic force generated by interaction of current flowing in the coil and a magnetic field formed by the magnet.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other features and advantages of the present invention will become more apparent by describing in detail preferred embodiments thereof with reference to the attached drawings in which.

DETAILED DESCRIPTION OF THE PREFERRED EMBODIMENTS

Figure 1:
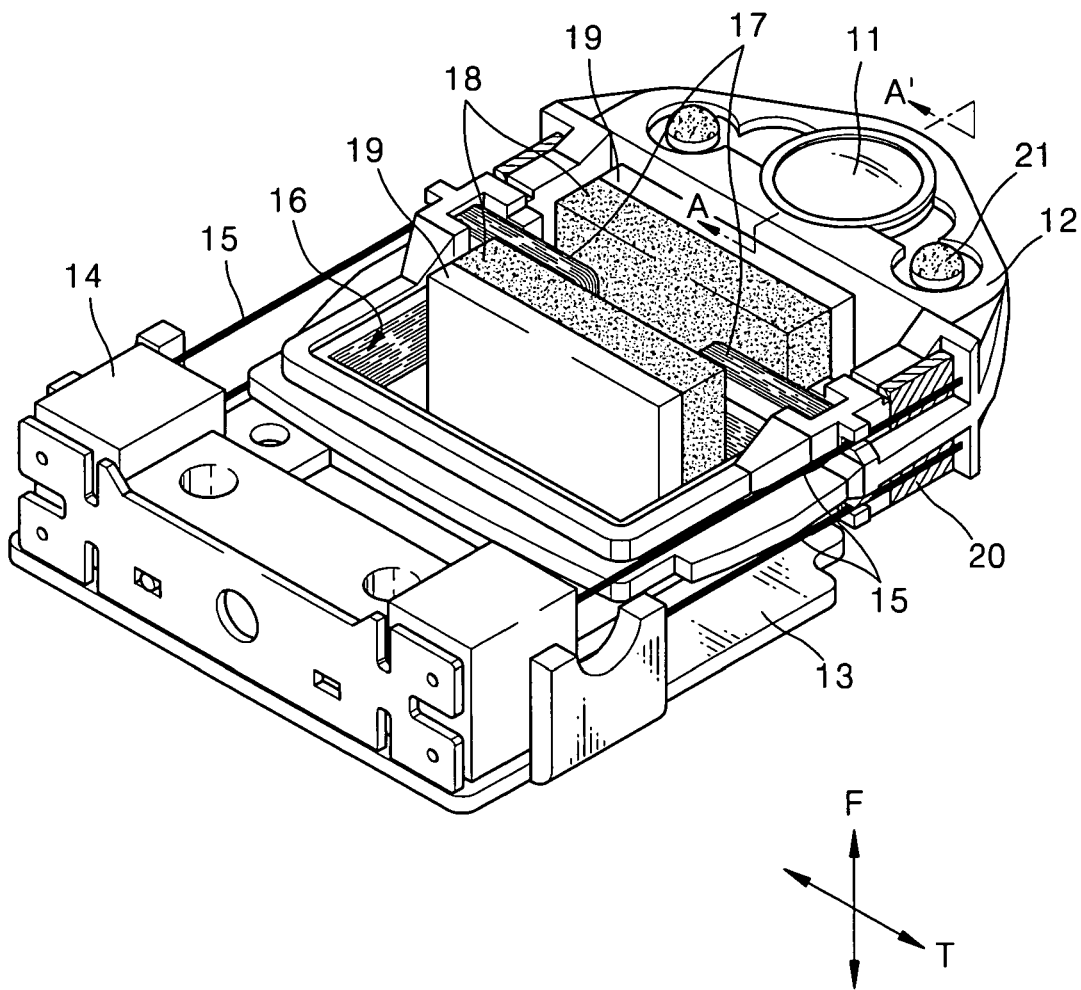
FIG. 1 is a perspective view illustrating a conventional asymmetrical optical pickup actuator.
Figure 2:
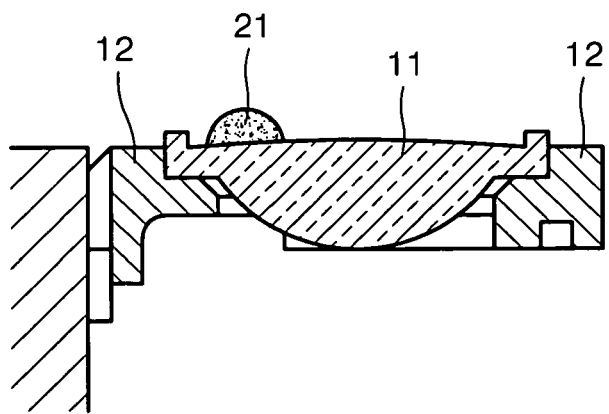
FIG. 2 is a sectional view, taken along the line A–A' of FIG. 1, illustrating a portion where a bobbin and an objective lens are coupled.

Reference will now be made in detail to the aspects of the present invention, examples of which are illustrated in the accompanying drawings, wherein like reference numerals refer to the like elements throughout. The aspects are described below to explain the present invention by referring to the figures.

In the following description and the accompanying drawings, the same reference numerals denote the same elements having the same functions.

Figure 3:
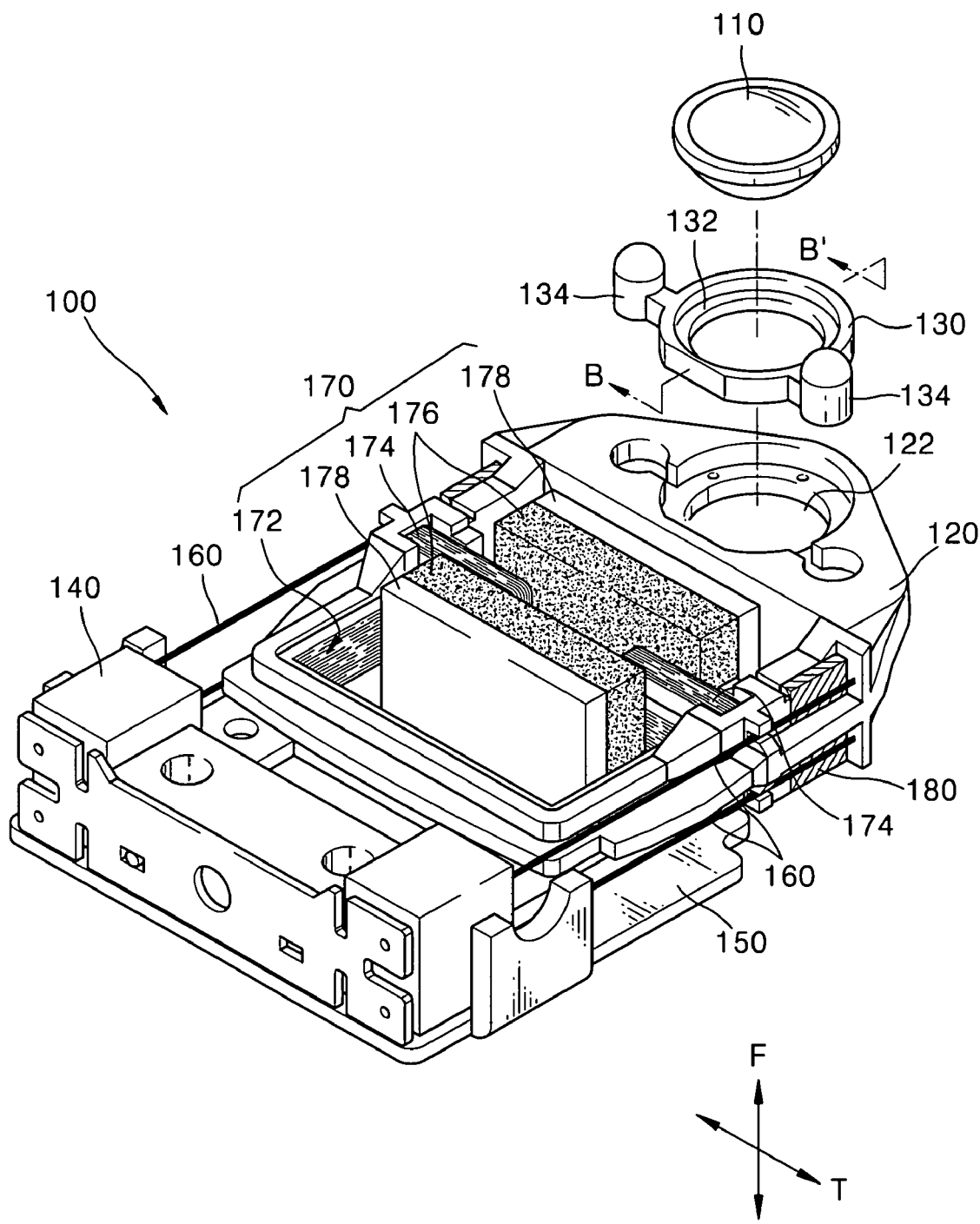
FIG. 3 is a partially exploded perspective view illustrating an optical pickup actuator according to the embodiment of the present invention.
Figure 4:
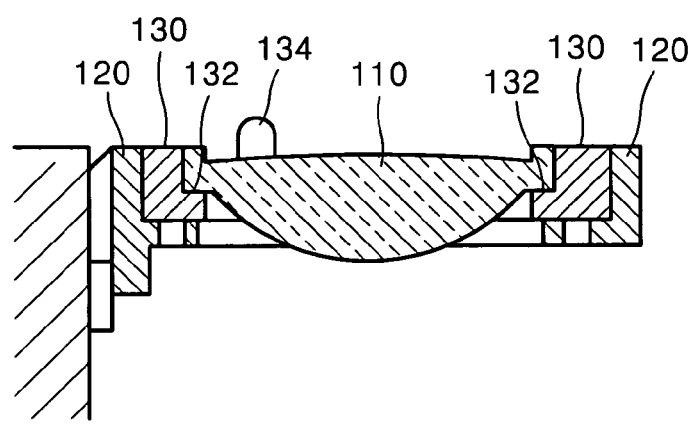
FIG. 4 is a sectional view, taken along the line B–B' of FIG. 3, illustrating a portion where a bobbin, a lens holder, and an objective lens are coupled.

Referring to FIGS. 3 and 4, an optical pickup actuator according to an aspect [embodiment] of the present invention includes a bobbin 120 where an objective lens 110 is mounted, a lens holder 130 installed at the bobbin 120 to support the objective lens 110, a plurality of suspension wires 160 to support the bobbin 120, and a driving unit 170 to drive the bobbin 120 in a focus direction F and a tracking direction T.

The bobbin 120 is supported by suspension wires 160 so that it may suspend with respect to a base 150 of the optical pickup 100. One end of each of the suspension wires 160 is attached to the bobbin 120 and the other end of each of the suspension wires 160 is attached to a holder 140 provided at one side of the base 150 of the optical pickup 100.

The bobbin 120 is made of a material that is light-weight and has a high rigidity for the manufacturing of compact and light-weight optical pickup actuators. For example, the bobbin 120 may be made of a reinforced plastic material and metal. Preferably, liquid crystal plastic (LCP) is used as the reinforced plastic material and magnesium alloy is used as the metal material.

A through hole 122 is formed in the bobbin 120 and the lens holder 130 is placed in the through hole 122. The lens holder 130 may be ring shaped. A step portion 132 may be formed on an inner circumference of the through hole 122 to accommodate an edge portion of the objective lens 110. The objective lens 110 may be attached to the lens holder 130 by a predetermined adhesive.

The lens holder 130 is made of a material having a heat conduction coefficient lower than that of the bobbin 120 in order to prevent or reduce the transfer of heat generated from coils 172 and 174 of the driving unit 170 to the objective lens 110 through the bobbin 120. Preferably, the lens holder 130 is formed of a heat-resistant plastic material.

The lens holder 130 is attached to the bobbin 120. There are several methods for attaching the lens holder 130 to the bobbin 120. In addition, there are several materials that may be used in connection with the lens holder 130 and the bobbin 120. For example, if the bobbin 120 is made of a metal material, such as a magnesium alloy, the lens holder 130 is injection-molded via an insert-molding method so that the bobbin 120 and the lens holder 130 are firmly coupled. When the bobbin 120 is made of a reinforced plastic material, the bobbin 120 and the lens holder 130 may be coupled by using an adhesive or inserting, sometimes forcibly, the lens holder 130 in the through hole 122 of the bobbin 120.

As described above, when the lens holder 130, having a low heat conduction coefficient, is installed between the bobbin 120 and the objective lens 110, the transfer of heat generated from the coils 172 and 174 of the driving unit 170 to the objective lens 110 is prevented or reduced. Therefore, deformation and damage of the objective lens 110 due to heat can be prevented.

According to the present invention, when the model of an optical recording/reproducing apparatus is changed the bobbin 120 does not need to be changed because the change of the lens holder 130 only is sufficient. This is true even when the number of operative and the effective diameter of the objective lens change. Thus, since one type of the bobbin 120 can be applied to all different types of models, mass productivity is improved and the manufacturing cost is reduced.

At least one buffer protrusion 134, but preferably two buffer protrusions 134, is provided on the lens holder 130. When the bobbin 120 collides against the optical disc due to deformation or vibration of the optical disc, the buffer protrusions 134 absorb the impact to prevent damage to the optical disc. Thus, preferably, the buffer protrusions 134 have a buffering feature, are flexible, and have hemispherically shaped upper end portions.

The buffer protrusions 134 are preferably formed on the lens holder 130 during manufacture. Thus, an additional operation to install the buffer protrusions 134 is not needed, thereby improving workability and productivity in comparison with the conventional coating method.

The driving unit 170 includes the focus coil 172 and the tracking coil 174. The focus coil 172 and the tracking coil 174 are installed at the bobbin 120 and move together in relation with the bobbin 120. The driving unit 170 further includes at least one pair of the magnet 176 and the yoke 178 fixedly installed on the base 150 to generate an electromagnetic force to drive the bobbin 120 in interaction with the current flowing in the focus coil 172 and the tracking coil 174. Additionally a PCB 180 to apply current to the focus coil 172 and the tracking coil 174 is arranged in at least one side of the bobbin 120.

When current is applied to the focus coil 172 and the tracking coil 174 through the PCB 180, an electromagnetic force is generated from the interaction of the current flowing in the focus coil 172 and the tracking coil 174 and the magnetic field formed by the magnet 176. The electromagnetic force moves the bobbin 120 in the focus direction F and the tracking direction T. Accordingly, the objective lens 110 supported by the lens holder 130 installed at the bobbin 120 is moved in either or both the focus direction F and the tracking direction T. When the direction and amount of current flowing in the focus coil 172 and the tracking coil 174 are adjusted, the direction and size of the electromagnetic force are changed and accordingly the movement of the bobbin 120 in the focus direction F and/or the tracking direction T can be controlled.

Figure 5:
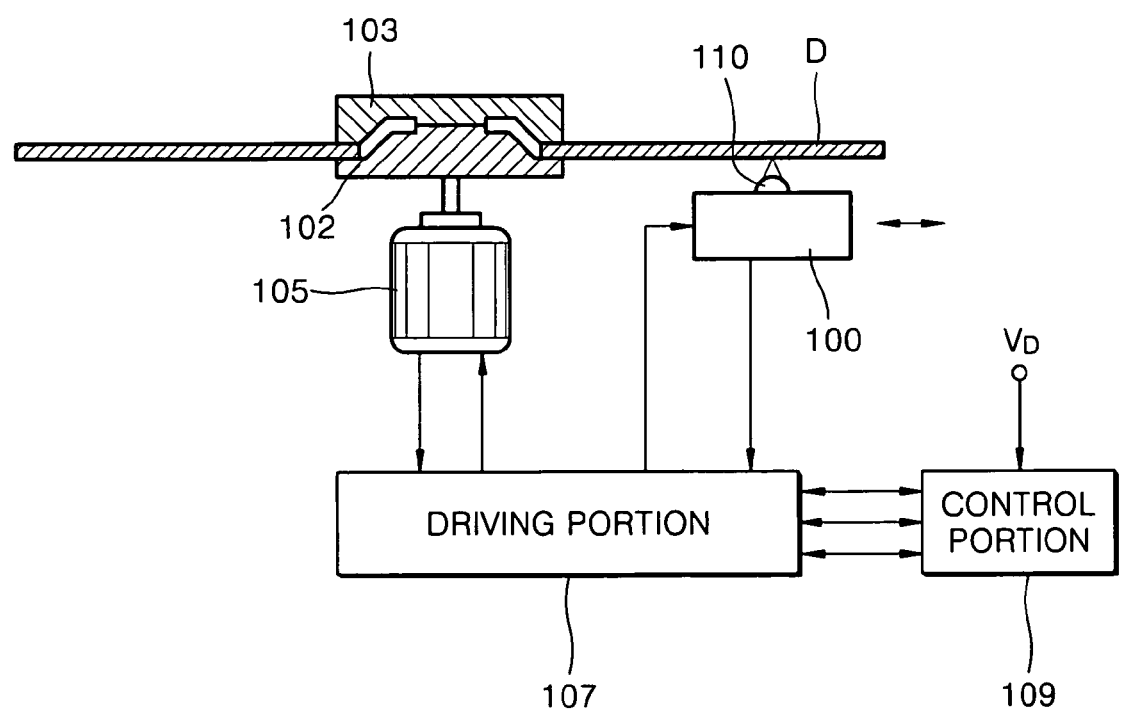
FIG. 5 is a view illustrating the structure of an optical recording and/or reproducing apparatus employing the optical pickup actuator of FIG. 3.

FIG. 5 shows the structure of an optical recording and/or reproducing apparatus employing the optical actuator according to the embodiment of the present invention.

Referring to FIG. 5, the optical recording and/or reproducing apparatus includes a spindle motor 105 to rotate an optical information storage medium, for example, an optical disc D. The apparatus further includes an optical pickup 100 capable of moving in a radial direction of the optical disc D to record and/or reproduce information with respect to the optical disc D, a driving portion 107 to drive the spindle motor 105 and the optical pickup 100, and a control portion 109 to control the focus, tracking, and/or tilt servo of the optical pickup 100. In addition, the apparatus includes a turntable 102 and a clamp 103 to secure the optical disc D.

The optical pickup 100 includes an optical pickup system having an objective lens 110 to focus light emitted from a light source on the optical disc D and an optical pickup actuator to drive the objective lens 110.

The light reflected by the optical disc D is detected by a photo detector, such as a photo diode, provided on the optical pickup 100 and optoelectrically converted to electric signal. The electric signal is then inputted to the control portion 109 via the driving portion 107.

The driving portion 107 controls the rotation speed of the spindle motor 105, amplifies an input signal, and drives the optical pickup 100.

The control portion 109 transmits focus servo, tracking servo, and/or a tilt servo commands and is controlled based on the signal output from the driving portion 107 to the driving portion 107 to enable focusing, tracking, and/or tilt operations of the optical pickup 100.

According to the optical pickup actuator described above, since the transfer of heat from the coil of the driving unit to the objective lens is prevented or restricted by the lens holder installed between the bobbin and the objective lens and has a relatively low heat conduction coefficient, the objective lens is protected from being deformed and damaged due to the heat. Thus, reliability in the operation of the optical pickup actuator is improved.

Also, since the buffer protrusions are formed with the lens holder, the optical disc is protected from being damaged by collision between the bobbin and the optical disc. Furthermore, since the buffer protrusions are formed with the lens holder, an additional work operation to install the buffer protrusions is not needed, thereby improving workability and productivity. In addition, since one type of the bobbin can be applied to multiple types of models by replacing the lens holder without changing the bobbin, productivity is improved and the manufacturing cost is reduced.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical pickup actuator comprising:
    a base;
    a bobbin in which a through hole is formed;
    an objective lens attached to the bobbin;
    a holder provided on the base to support the bobbin;
    a lens holder inserted in the through hole of the bobbin to support the objective lens, wherein the lens holder is made of a material having a heat conduction coefficient lower than that of the bobbin;
    a plurality of suspensions, each suspension having one end coupled to the bobbin and the other end attached to the holder provided on the base, to support the bobbin; and
    a driving unit having a coil installed at the bobbin and a magnet installed on the base to drive the bobbin with an electromagnetic force generated by interaction of current flowing in the coil and a magnetic field formed by the magnet,
    wherein the lens holder is a ring shape further comprising:
        a step portion that is formed on an inner circumference of the lens holder in which to accommodate an edge of the objective lens, and
        a pair of buffer protrusions outwardly extended from a periphery of the lens holder, each of the buffer protrusions having a hemispherically shaped upper end portion.

2. The optical pickup actuator as claimed in claim 1, wherein the lens holder is made of a heat-resistant plastic material.

3. The optical pickup actuator as claimed in claim 2, wherein the bobbin is made of a reinforced plastic material.

4. The optical pickup actuator as claimed in claim 2, wherein the bobbin is made of a magnesium alloy material.

5. An optical recording and/or reproduction apparatus including an optical pickup, the apparatus comprising:
    an objective lens to focus light emitted from a light source on an optical information storage medium; and
    an optical pickup actuator to drive the objective lens, wherein the optical pickup actuator moves in a radial direction of the optical disc to record and/or reproduce information by emitting a light to a desired position on the optical disc, wherein the optical pickup actuator comprises:

a base;
a bobbin in which a through hole is formed;
an objective lens attached to the bobbin;
a holder provided on the base to support the bobbin;
a lens holder inserted in the through hole of the bobbin to support the objective lens;
a plurality of suspensions, each suspension having one end coupled to the bobbin and the other end attached to the holder provided on the base, to support the bobbin; and
a driving unit having a coil installed at the bobbin and a magnet installed on the base to drive the bobbin with an electromagnetic force generated by interaction of current flowing in the coil and a magnetic field formed by the magnet,
wherein the lens holder is a ring shape and further comprises:
a step portion that is formed on an inner circumference of the lens holder in which to accommodate an edge of the objective lens, and
a pair of buffer protrusions outwardly extended from a periphery of the lens holder, each of the buffer protrusions having a hemispherically shaped upper end portion.

6. The optical recording and/or reproduction apparatus as claimed in claim 5, wherein the lens holder is made of a heat-resistant plastic material.

7. The optical recording and/or reproduction apparatus as claimed in claim 6, wherein the bobbin is made of a reinforced plastic material.

8. The optical recording and/or reproduction apparatus as claimed in claim 6, wherein the bobbin is made of a magnesium alloy material.

9. An optical pickup actuator comprising:
a base;
a bobbin in which a through hole is formed;
an objective lens attached to the bobbin;
a holder provided on the base to support the bobbin;
a lens holder inserted in the through hole of the bobbin to support the objective lens;
a plurality of suspensions, each suspension having one end attached to the bobbin and the other end attached to the holder provided on the base, to support the bobbin; and
a driving unit to drive the bobbin,
wherein the lens holder is a ring shape and further comprises:
a step portion that is formed on an inner circumference of the lens holder in which to accommodate an edge of the objective lens, and
a pair of buffer protrusions outwardly extended from a periphery of the lens holder, each of the buffer protrusions having a hemispherically shaped upper end portion.

10. The optical pickup apparatus of claim 9, wherein the lens holder is made of a material having a heat conduction coefficient lower than that of the bobbin in order to reduce the transfer of heat generated from an at least one coil of the driving unit to the objective lens through the bobbin.

11. The optical pickup actuator of claim 9, wherein the buffer protrusions are integrally formed with the lens holder.

12. The optical pickup actuator of claim 9, wherein the buffer protrusions are made of a flexible material to absorb the impact and to prevent damage to the optical disc when the bobbin collides against the optical disc.

13. The optical pickup actuator as claimed in claim 9, wherein the lens holder is made of a heat-resistant plastic material.

14. The optical pickup actuator of claim 9, wherein the lens holder is made of a heat resistant plastic-composite material.

15. The optical pickup actuator as claimed in claim 9, wherein the bobbin is made of a reinforced plastic material.

16. The optical pickup actuator of claim 9, wherein the bobbin is made of a liquid crystal plastic.

17. The optical pickup actuator as claimed in claim 9, wherein the bobbin is made of a magnesium alloy material.

18. The optical pickup actuator of claim 9, wherein the bobbin is made of a metal material and the lens holder is injection-molded via an insertion molding process.

19. The optical pickup actuator of claim 9, wherein the bobbin is made of a reinforced plastic material and the bobbin and/or lens holder comprises an adhesive material attached thereto in order to attach together the bobbin and the lens holder.

20. The optical pickup actuator of claim 9, comprising at least one printed circuit board attached to the bobbin in order to output current to at least one coil of the driving unit.

21. The optical pickup actuator of claim 9, wherein the driving unit comprises:
at least one coil installed at the bobbin; and
at least one magnet installed on the base;
wherein the at least one coil and the at least one magnet respectively generate an electromagnetic force to drive the bobbin.

22. The optical pickup actuator of claim 21, wherein the at least one coil comprises a focus coil and/or a tracking coil.

* * * * *

UNITED STATES PATENT AND TRADEMARK OFFICE
CERTIFICATE OF CORRECTION

| | |
|---|---|
| PATENT NO. | : 7,228,553 B2 |
| APPLICATION NO. | : 10/778314 |
| DATED | : June 5, 2007 |
| INVENTOR(S) | : Young-Bin Lee et al. |

It is certified that error appears in the above-identified patent and that said Letters Patent is hereby corrected as shown below:

Title Page, Item (57) (Abstract), Line 1, after "includes" delete "a;".

Signed and Sealed this

Thirtieth Day of October, 2007

JON W. DUDAS
*Director of the United States Patent and Trademark Office*